United States Patent [19]

Agnoff

[11] Patent Number: 5,281,189

[45] Date of Patent: Jan. 25, 1994

[54] CROWNED PULLEY FOR A BELT CONVEYOR

[75] Inventor: Charles Agnoff, Wilmington, N.C.

[73] Assignee: Interroll Holding A.G., San Antonino, Switzerland

[21] Appl. No.: 9,736

[22] Filed: Jan. 27, 1993

[51] Int. Cl.$^5$ .............................................. F16H 7/00
[52] U.S. Cl. ..................................... 474/190; 474/191
[58] Field of Search ...................... 474/174, 190–191, 474/166

[56] References Cited

U.S. PATENT DOCUMENTS 3,098,284 7/1963 Hornbostel ................... 474/191 X
3,220,272 11/1965 Beausoleil ..................... 474/191 X Primary Examiner—Thuy M. Bui
Attorney, Agent, or Firm—Rhodes, Coats & Bennett

[57] ABSTRACT

An improved construction for a crowned and lagged pulley for a belt conveyor includes a roller tube having a central portion and two outer end portions. A pair of circumferentially extending grooves are formed in the outer surface of the roller tube between the central portion and respective end portions. An elastomeric member is disposed around the central portion of the roller tube and includes first and second end received in respective grooves such that the ends of the elastomeric member lie flush with the outer end portions of the roller tube. The thickness of the elastomeric member, when added to the outside diameter of the roller tube, produces a crown. Also, the elastomeric member serves as lagging for the pulley.

14 Claims, 3 Drawing Sheets

CROWNED PULLEY FOR A BELT CONVEYOR

FIELD OF THE INVENTION

The present invention relates generally to drive rollers for applying a motive force to a conveyor belt and more particularly to an improved method for crowning and/or lagging conveyor pulleys on a belt conveyor.

Typically, a belt conveyor includes a pair of spaced apart pulleys or rollers which are rotatively mounted to a frame. A conveyor belt is entrained around the pulley and provides a conveying surface to move objects from an inlet end of the conveyor to a discharge end. Some form of motor drive is connected to one of the pulleys, usually referred to as the drive pulley. The input torque is transmitted by friction from the drive pulley to the conveyor belt causing the conveyor belt to move along a continuous path.

A common problem associated with many belt conveyors is the tendency of the conveyor belt to drift sideways. If the conveyor belt drifts too far to one side, the belt may rub against the frame of the conveyor causing excessive wear and greatly decreasing the life of the conveyor belt. Additionally, the friction caused by the belt rubbing against the conveyor frame increases the load on the drive motor and increases the horsepower consumption.

Crowned pulleys or rollers are commonly used to keep the conveyor belt tracking properly and from drifting sideways. Crowned pulleys generally come in two configurations—tapered crowns and trapezoidal crowns. In pulleys with tapered crowns, the surface of the pulley tapers upwardly from each end towards the center of the pulley. The tapered surfaces meet at the center of the pulley to form an apex. In pulleys having trapezoidal crowns, the surface of the pulley tapers upwardly from each end of the pulley to a flat (when viewed in cross-section) center portion. In either case, the center diameter of the drive pulley is generally one to two percent greater in diameter than the ends of the pulley. The difference in diameter is sufficient to cause the belt to constantly correct itself to maintain its central position on the drive pulley.

Crowned pulleys currently in use are produced from heavy metal wall tubing. The outside surface of the tubing is machined to provide the desired crown profile. The machining process is relatively expensive and a substantial portion of the machine tube material ends up as unusable chips resulting in an expensive material loss.

Another problem with many belt conveyors is the tendency of the drive pulley to slip relative to the belt resulting in a loss of torque. Modern conveyor belts are extremely flexible and generally work well with drive pulleys of relatively small diameter. However, as the drive pulley diameter decreases, there is less surface area to contact the conveyor belt and provide traction. Additionally, torque transmission is further limited by the low coefficient of friction between the belt and the metal drive pulley. To increase the torque transmission capacity of the drive pulley, rubber or other synthetic material with a high coefficient of friction is frequently molded or otherwise applied to the surface of the drive pulley. This covering is referred to as "lagging." Lagging is effective in providing increased traction. However, the cost of the lagging material is usually high, and the process for applying the lagging to the roller is relatively expensive. A less expensive form of lagging is wrap-around, friction surface tape lagging which provides added traction. This method provides a form of crown, but may cause the conveyor belt to be stretched.

SUMMARY AND OBJECTS OF THE INVENTION

The present invention relates to a new construction for a crowned and lagged pulley which is easily produced, highly efficient, and extremely cost effective. The roller is made from a thin-walled metal tube having a substantially uniform diameter along its entire length. A pair of circumferentially extending grooves are formed a predetermined distance from each end of the roller tube and define a central portion between the grooves. The grooves are formed by a precision, rollforming fabrication process. No chip-producing machining operations are required. An elastomeric tube is disposed around the central portion of the roller tube. The ends of the elastomeric tube fit into the circumferential grooves and are flush with the outer end portions of the tube. The elastomeric tube is placed onto the roller tube by stretching the tube and sliding it over one end of the roller tube. Alternately, the elastomeric tube can be made of a heat shrinkable material. In this case, the elastomeric tube slides over the end of the roller tube into position and then heat is applied to shrink the elastomeric tube.

When the wall thickness of the elastomeric tube is added to the outside diameter of the metal tube, a crown is formed along the central portion of the tube. Further, because of the elastomeric tube is constricted by the grooves in the pulley, axial movement of the elastomeric tube is prevented.

Based on the foregoing, it is an object of the present invention to provide an improved construction for a crowned and lagged pulley which is easy to manufacture and relatively inexpensive to produce.

Another object of the present invention is to provide a crowned and lagged pulley for a belt conveyor which will keep the conveyor belt tracking properly without drifting side-to-side.

Still another object of the present invention is to provide a crowned and lagged pulley for a belt conveyor which transfers torque efficiently to the conveyor belt without slipping.

Yet another object of the present invention is to provide a crowned and lagged pulley made from thin-wall metal tubing.

Another object of the present invention is to provide a crowned and lagged pulley which can be manufactured without any chip-producing machining operations.

Other objects and advantages of the present invention will become apparent and obvious from a study of the following description and the accompanying drawings which are merely illustrative of such invention.

DETAILED DESCRIPTION OF THE INVENTION

Figure 1:
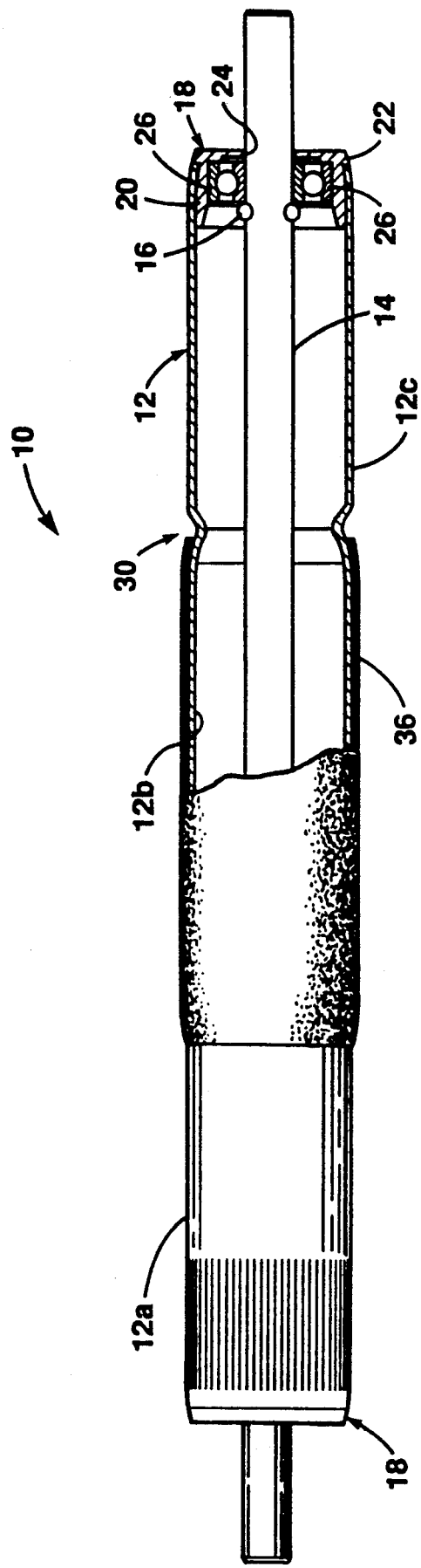
FIG. 1 is an elevation view of the crowned and lagged pulley of the present invention with a portion shown in section.

Referring now to the drawings, and particularly to FIG. 1, the crowned and lagged pulley of the present invention is shown therein and indicated generally by the numeral 10. The pulley 10 includes a thin-walled roller tube 12 mounted on a shaft 14. The wall of the roller tube 12 has a uniform thickness throughout the entire length of the roller tube 12. Similarly, the diameter of the roller tube 12 is substantially constant along the entire length of the roller tube 12.

A pair of end caps 18 are fit into respective ends of the roller tube 12. Each end cap 18 includes a sleeve portion 20 and a flange portion 22. An opening 24 is formed in the center of the flange portion 22 through which the roller shaft 14 extends. A roller bearing 26 is held within the sleeve portion 20 of the end cap 18 and is journalled around the roller shaft 14. Protrusions 16 on the shaft 14 prevent the bearing from sliding axially along the shaft. Thus, the roller tube 12 will freely rotate on the shaft 14. The roller tube 12 is driven directly by any suitable drive means (not shown) while the shaft remains stationary.

Figure 3:
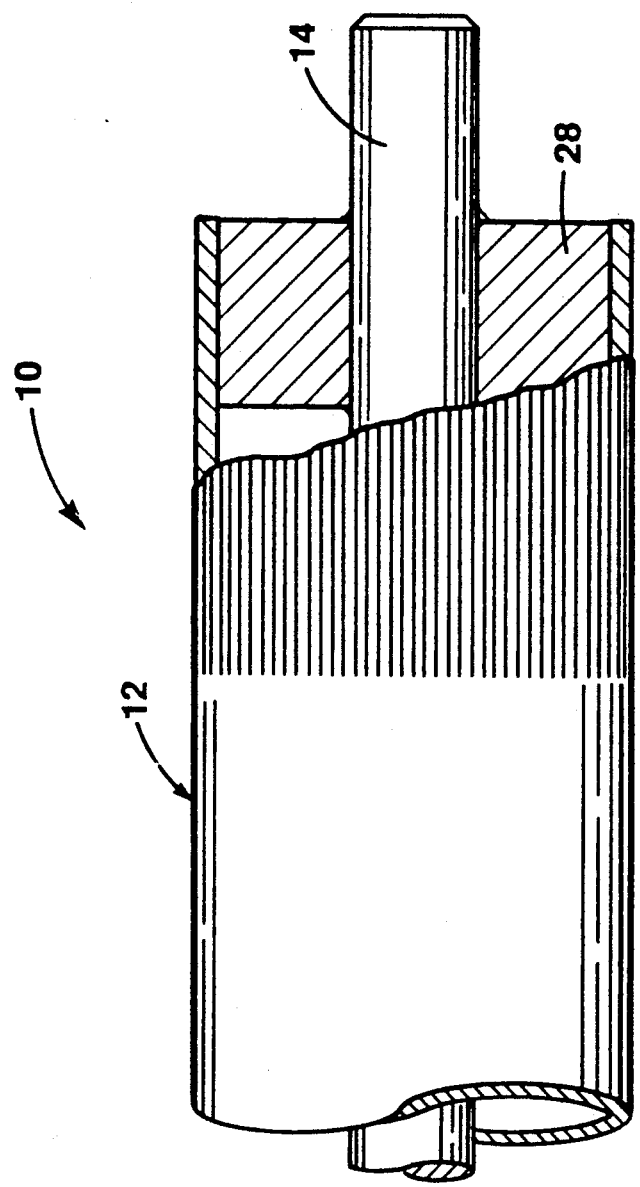
FIG. 3 is a partial elevation view of a second embodiment of the crowned and lagged pulley of the present invention with a portion shown in section.

In a second embodiment of the invention, shown in FIG. 3, a pair of end plugs 28 are fixedly secured in respective ends of the roller tube 12. The end plugs 28 are of solid construction and are locked to the roller shaft 14 by any suitable means, such as by spot welding. In this embodiment the shaft 14 is powered by a suitable drive means (not shown) to rotate the pulley 10.

The roller tube 12, in either embodiment, is formed with a pair of circumferentially extending grooves 30 a predetermined distance from each end of the roller tube 12. The grooves 30 divide the roller tube 12 into a central portion 12b, and two end portions 12a and 12c. The grooves 30 are formed by a precision, roll-forming, fabrication process which is well known to those skilled in the art. The configuration of the groove 30 is shown in detail in FIG. 2. The roller tube 12 is bent during the roll forming process so as to form a retaining wall 32 along one side of the groove. The central portion 12b of the roller tube includes a tapered section 34 which inclines inwardly towards the lower end of the retaining wall 32. While the configuration shown in FIG. 2 is preferred, there may be other configurations which produce satisfactory results.

Referring back to FIG. 1, an elastomeric tube 36 is disposed around the central portion 12b of the roller tube 12. The elastomeric tube 36 is made of a resilient material having a high coefficient of friction, such as polyurethane. Polyurethane is also advantageous due to its resistance to abrasion. Other materials, such as neoprene and natural rubber, could also be used.

The elastomeric tube 36 is applied to the roller tube by stretching the tube, inserting it over one end of the roller tube 12 and positioning it over the central portion 12b. When the elastomeric tube 36 is released, it conforms to the outer surface of the roller tube 12. The elastomeric tube 36 could also be made of a heat shrinkable material which is shrunk by application of heat after the tube 36 is positioned around the central portion 12b of the roller tube 12. A third method for applying the elastomeric material would be to mold the elastomeric material around the roller tube 12. Molding processes, however, are generally more expensive than the other two methods.

Figure 2:
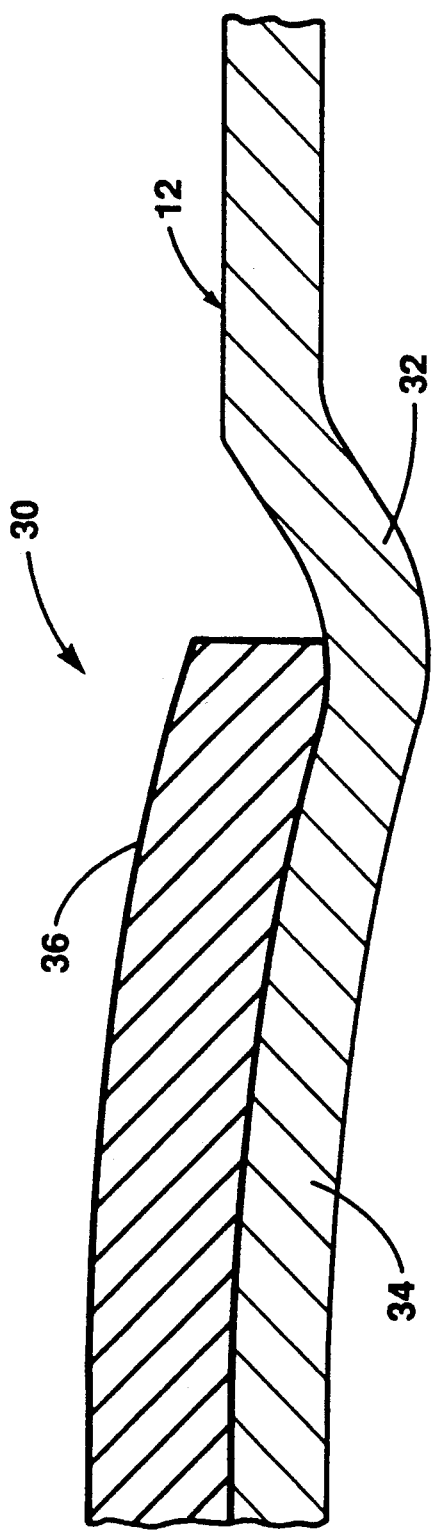
FIG. 2 is a detailed section view illustrating the circumferential groove in the roller tube.

When properly positioned, the ends of the elastomeric tube 36 are received in respective grooves 30 in the roller tube 12 as seen in FIG. 2. Preferably, the wall thickness of the elastomeric tube 36 corresponds to the depth of the groove 30 so that the ends of the elastomeric tube 36 are flush with the outer end portions 12a and 12c of the roller tube 12. The wall thickness of the elastomeric tube 36, when added to the outside diameter of the roller tube 12, produces a crown around the central portion 12b of the roller tube 12. At the same time, the elastomeric tube 36 serves as "lagging" to provide for more efficient transfer of torque to the conveyor belt.

Based on the foregoing, it is apparent that the present invention provides an improved construction for a crowned and lagged pulley which is easily produced, highly efficient, and extremely cost effective. The pulley can be manufactured from thin-walled, metal tubing without the need for chip producing, machining operations. The result is a conveyor pulley which is extremely economical to manufacture.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:
1. A pulley for a belt conveyor comprising:
   (a) a roller shaft;
   (b) a generally cylindrical roller tube mounted on said roller shaft, said roller tube being rotatable about an axis of said roller shaft;
   (c) said roller tube including first and second end portions disposed on opposite sides of a central portion;
   (d) a pair of circumferentially extending grooves formed between respective end portions and said central portion; and
   (e) an elastomeric crown disposed around said central portion of said roller tube and having first and second ends received in respective circumferential grooves in the roller tube.
2. The pulley of claim 1 wherein said roller tube is rotatably mounted on the roller shaft.
3. The pulley of claim 1 wherein the roller tube is fixedly secured to the roller shaft.
4. The pulley according to claim 1 wherein the elastomeric crown is made of polyurethane.
5. The pulley of claim 1 wherein the elastomeric crown is made of neoprene.
6. The pulley of claim 1 wherein the elastomeric crown is made of rubber.
7. The pulley of claim 1 wherein the elastomeric crown comprises an elastomeric tube insertable over the end of the roller tube.
8. A pulley for a belt conveyor comprising:
   (a) a generally cylindrical roller having a central portion and a pair of outer end portions disposed on opposite sides of the central portion;
   (b) an elastomeric crown disposed around the central portion of the cylindrical roller and including first and second ends; and
   (c) a pair of circumferentially extending grooves formed in the outer surface of the cylindrical roller for retaining the elastomeric crown on the cylindri- cal roller, each cylindrical groove being disposed between the central portion and a respective outer end portion of the roller tube.

9. The pulley according to claim 8 wherein the first and second ends of the elastomeric crowns are received in respective circumferential grooves in the cylindrical roller.

10. The pulley of claim 9 wherein the outer surface of the elastomeric crown is flushed with the outer surface of the outer end portions of the cylindrical roller.

11. The pulley of claim 10 wherein the elastomeric crown comprises an elastomeric tube disposed around the central portion of the cylindrical roller.

12. A method for crowning and lagging a conveyor pulley comprising:
 (a) providing a roller tube having a generally cylindrical outer surface;
 (b) forming a pair of circumferentially extending grooves a pre-determined distance from each end of the conveyor roller such that the circumferential grooves define two outer end portions and a central portion disposed between said grooves;
 (c) applying an elastomeric covering to the central portion of the roller tube, such that the opposite ends of the elastomeric covering are received in respective grooves in the roller tube and are substantially flushed with the outer end portions of the roller tube.

13. The method of claim 12 wherein the step of applying the elastomeric material to the central portion of the roller tube includes forming a tube with said elastomeric material; inserting the elastomeric tube over one end of the roller tube; and positioning the elastomeric tube around the central portion of the roller tube.

14. The method of claim 13 wherein the step of forming the circumferential grooves in the roller tube includes bending the wall of the roller tube.

* * * * *